(12) United States Patent
Amalapurapu et al.

(10) Patent No.: US 10,198,524 B1
(45) Date of Patent: Feb. 5, 2019

(54) DYNAMIC CATEGORIES

(71) Applicant: BloomReach Inc., Mountain View, CA (US)

(72) Inventors: Suchitra Amalapurapu, Bangalore (IN); Anand Raghuraman, Campbell, CA (US); Rahul Bhandari, Bixby, OK (US); Vinodh Kumar Ravindranath, Bangalore (IN); Jasvinder Singh, Bangalore (IN); Ashutosh Garg, Sunnyvale, CA (US)

(73) Assignee: BloomReach Inc., Mountain View, CA (US)

( * ) Notice: Subject to any disclaimer, the term of this patent is extended or adjusted under 35 U.S.C. 154(b) by 469 days.

(21) Appl. No.: 14/306,681

(22) Filed: Jun. 17, 2014

Related U.S. Application Data

(60) Provisional application No. 61/856,534, filed on Jul. 19, 2013.

(51) Int. Cl.
*G06F 17/30* (2006.01)

(52) U.S. Cl.
CPC .................. *G06F 17/3089* (2013.01)

(58) Field of Classification Search
None
See application file for complete search history.

(56) References Cited

U.S. PATENT DOCUMENTS

| | | | | |
|---|---|---|---|---|
| 6,912,505 B2* | 6/2005 | Linden | ............... | G06Q 30/02 705/14.53 |
| 7,668,821 B1* | 2/2010 | Donsbach | ......... | G06F 17/30867 707/765 |
| 7,836,051 B1* | 11/2010 | Mason | ............... | G06Q 30/02 707/734 |
| 8,560,398 B1* | 10/2013 | Gregov | ............... | G06Q 30/06 705/26.2 |
| 2003/0050916 A1* | 3/2003 | Ortega | ............... | G06F 3/0482 |
| 2005/0038717 A1* | 2/2005 | McQueen, III | ......... | G06Q 30/02 705/26.61 |
| 2012/0226681 A1* | 9/2012 | Paparizos | ........... | G06F 17/3053 707/723 |

* cited by examiner

*Primary Examiner* — Anhtai V Tran
(74) *Attorney, Agent, or Firm* — Moser Taboada

(57) ABSTRACT

Techniques for providing dynamic categories are disclosed. In some embodiments, a system for providing dynamic categories includes receiving user context data, and dynamically determining a plurality of categories for the user based on the user context data, in which the plurality of categories are for categorizing content on a web site. For example, the user context data can be based on monitored user behavior on a web site, and one or more of the plurality of categories can include a synthesized category on the web site that is dynamically generated based on the monitored user behavior on the web site.

14 Claims, 7 Drawing Sheets

Original static browse menu / category tree for a site

Products browsed by an example user

Example Dynamic Categories created for the user

DYNAMIC CATEGORIES

CROSS REFERENCE TO OTHER APPLICATIONS

This application claims priority to U.S. Provisional Patent Application No. 61/856,534 entitled DYNAMIC CATEGORIES filed Jul. 19, 2013, which is incorporated herein by reference for all purposes.

BACKGROUND OF THE INVENTION

Internet-based web services can be delivered through web sites on the World Wide Web (WWW). A web site is typically a set of related web pages served from a web domain. Web pages are often formatted using HyperText Markup Language (HTML), eXtensible HTML (XHTML), or using another language that can be processed by a web browser that is typically executed on a user's client device, such as a computer, tablet, phablet, smart phone, smart television, or other client device. A web site is generally hosted on a web server. The web server is typically accessible via a network, such as the Internet, through a web address, which is generally known as a Uniform Resource Indicator (URI) or a Uniform Resource Locator (URL).

For example, a web service can be delivered via a web site. Web sites can provide various content on the web site for presenting to users. Example web sites include publisher sites (e.g., online newspapers and online magazines), e-commerce shopping sites, social networking web sites, and/or other web services.

A web site can be a static web site. Generally, a static web site does not customize content delivered to different users of the web site (e.g., a static web site has web pages stored on a web server in the format that is sent to a client web browser).

A web site can be a dynamic web site or can include dynamic web pages. Generally, a dynamic web site can customize content delivered to different users of the web site (e.g., a dynamic web site is one that can change or customize web content automatically).

BRIEF DESCRIPTION OF THE DRAWINGS

Various embodiments of the invention are disclosed in the following detailed description and the accompanying drawings.

DETAILED DESCRIPTION

Figure 1:
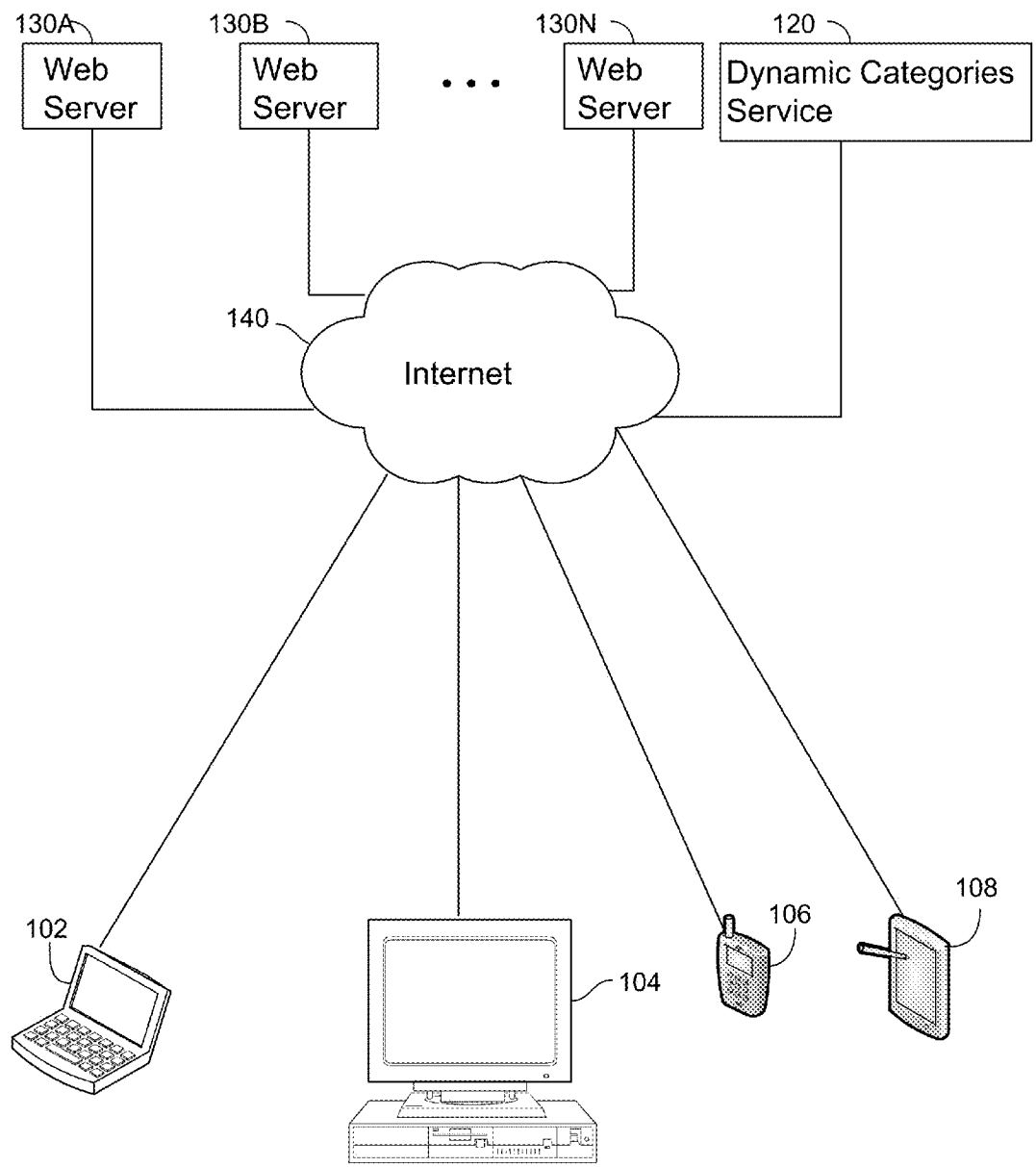
FIG. 1 is a block diagram illustrating an overview of an architecture of a system for providing dynamic categories in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Web sites (e.g., web applications and/or various other web services delivered through web sites) generally store and display content (e.g., products or services related content in the case of a retailer, such as an e-commerce site; various informational related content in the case of a publisher, such as an online news or online magazine site; and/or various other content for other types of merchant sites). For example, this content can be accessed by a user in two primary ways: (1) an internal site search approach; and (2) a non-search approach (e.g., browse and/or site navigation).

For users who do not search and instead use the browsing/site navigation approach to find the content they are seeking on a particular web site, web sites (e.g., web applications) typically attempt to organize data in a way that is easy for a user to comprehend and expose relevant content for the user.

The presentation of this organization structure (e.g., organizing content into categories, such as using a category tree) is usually static across users (i.e., the category tree or other organizational/hierarchical structure presented on a given web site generally is the same regardless of which user is accessing the site), even though different users often have varying interests and needs. In particular, this is a problem as this static organization structure approach for presenting content of a site generally does not contribute to a web service provider's goal of organizing and presenting content available through the site in a way that is easy for each user to comprehend and exposing relevant content for the user (e.g., allowing a user to access the content that he/she is seeking with a shortest path).

There are several aspects of these static navigation strategies that are not optimal. Two examples of such shortcomings are briefly discussed below.

First, browse categories on a web site are typically predefined and set for a generic user (e.g., the browse categories for navigation by category through content on a site are static on the site). This static navigation structure may not be presented in a way that adequately frames the unique needs of a particular user (e.g., a given user may prefer a different navigation structure and/or may not be able to easily or efficiently navigate to their content of interest using such a static navigation structure). For example, an apparel site (e.g., a merchant site that offers various apparel and/or other shoe and accessory related products for sale) may organize products by either type or designer and classify products into each of these categories, such as by having a top navigation bar on the web site, providing the following options: apparel, shoes, accessories, and sale. But for a user that frequently prefers a particular set of attributes (e.g., color black or some other attribute(s)), an appropriate category structure may be different (e.g., the top navigation bar may be black apparel, black shoes, black accessories, items in other colors, etc.). However, existing web sites generally do not adapt their browse structure to create new categories or user specific categories.

Second, ranking of items in a browse navigation path is typically static. Even if the structure is adequately framed in the interests or needs of the user (e.g., products may be organized by type on a site, and this is how a user prefers to see them), the paths are typically not ranked according to a given user's preferences. As a result, this approach can conceal and/or make it more difficult for users to navigate to important paths and relevant content using such a site navigation approach.

By failing to adapt both the structure and the presentation of this structure, web services can lose an opportunity to expose relevant content in a way that is framed per the user's preferences. Furthermore, web applications can lose opportunities for customer engagement and, as a result, lose potential revenue generation.

Thus, what are needed are new and improved techniques for providing and presenting content of web services to a user, such as through dynamically customizing an organization and selection of content of a web site(s) for a user.

Accordingly, techniques for providing dynamic categories are disclosed. For example, various techniques for determining categories dynamically (e.g., dynamic categories) are disclosed in accordance with some embodiments. These techniques can be used, for example, for determining different categories on a site that are dynamic categories personalized to a user or to a group of users (e.g., a user profile based on an aggregate of users).

In some embodiments, instead of presenting predefined categories based on an inventory structure (e.g., also referred to as static categories), categories are created dynamically (e.g., selected and/or synthesized on-the-fly) based on a particular user's interests and/or based on a group of users' interests (e.g., such categories that are created dynamically are also referred to as dynamic categories) and presented to the user for browsing. For example, techniques for providing dynamic categories, such as disclosed herein, can relieve a user from having to browse or even be presented with categories that are either too broad for the user (e.g., shoes if a user is only interested in women's shoes) or irrelevant to the user (e.g., girl's dresses should not be presented to a user who is actually only looking for women's dresses).

Further, web services providing online content (e.g., dynamic or other customized content for a web site) can be customized, to provide different content to different users. For example, there is a need for service providers to control the manner of presentation and/or to customize the content and/or services that are presented for each user. Customization and personalization with respect to interface, content, and other aspects can lead to additional revenue for the service provider and can also provide a better user experience for its users. Thus, various techniques for providing dynamic categories are disclosed that can be provided as a service to web service providers and/or implemented by web service providers to personalize the content and form of their services (e.g., through dynamic web site implementations that can customize content delivered to users based on user profiles).

In some embodiments, a system for providing dynamic categories includes receiving user context data, and dynamically determining a plurality of categories for the user based on the user context data, in which the plurality of categories are for categorizing content on a web site. For example, the user context data can be based on monitored user behavior on a web site (e.g., tracked using a pixel log), and one or more of the plurality of categories can include a synthesized category on the web site that is dynamically generated based on the monitored user behavior on the web site. As another example, the user context data can be based on monitored user behavior on a web site, and one or more of the plurality of categories can include an existing category on the web site that is dynamically determined (e.g., selected for presenting to the user) based on the monitored user behavior on the web site.

In some embodiments, a system for providing dynamic categories further includes dynamically generating a plurality of synthesized categories for the user based on the user context data.

In some embodiments, a system for providing dynamic categories further includes sending the dynamically determined plurality of categories for the user based on the user context data to the web site. For example, the web site can present at least one of the dynamically determined plurality of categories.

In some embodiments, a system for providing dynamic categories further includes presenting at least one of the dynamically determined plurality of categories for the user based on the user context data.

In some embodiments, a system for providing dynamic categories further includes determining content for each of the plurality of categories for the user based on the user context data. For example, content from a web site can be determined for including in a dynamically synthesized category based on the monitored user behavior(s) on the web site. As another example, content from a web site can be determined for including in an existing category that was determined for presenting to a user based on the monitored user behavior(s) on the web site.

In some embodiments, a system for providing dynamic categories further includes ranking the plurality of categories for the user based on the user context data. For example, the ranking can be based on a particular user of the web site and/or based on an aggregate of users of the web site.

In some embodiments, a system for providing dynamic categories further includes ranking content of the web site for including in each of the plurality of categories for the user based on the user context data. For example, the ranking can be based on a particular user of the web site and/or based on an aggregate of users of the web site. In some implementations, a user profile is generated based on the monitored user behavior(s) on the web site of a particular user or an aggregate of users on the web site. In some cases, one or more attributes can be associated with a particular user profile based on the monitored user behavior(s) on the web site.

In some embodiments, a system for providing dynamic categories further includes determining categories and ranking categories based on a particular user of the web site and/or based on an aggregate of users of the web site. For example, the ranking can be applied for determining a display order of the plurality of categories for presenting to the user of the web site (e.g., existing and/or synthesized categories).

In some implementations, the dynamic categories can include at least one existing, static category on the merchant web site. In some implementations, the dynamic categories can include at least one dynamically generated category that is not a static, existing category on the merchant web site (e.g., a synthesized category).

In some embodiments, a system for providing dynamic categories further includes receiving a configuration input from a web site provider. For example, a web site provider can configure the system for providing dynamic categories to promote or to denigrate certain categories, content, and/or attributes (e.g., using a boost value or other techniques as further described herein).

In some embodiments, a system for providing dynamic categories further includes receiving user input (e.g., feedback from a user). For example, a user can provide feedback to the system for providing dynamic categories to promote or to denigrate certain categories, content, and/or attributes (e.g., allowing a user to indicate whether the user prefers a particular category and/or whether the user prefers a particular attribute).

In a common scenario, assume that a user, named Bob, browses a web service, such as ACME.com using a client device, such as Bob's smart phone or Bob's computer (e.g., in some cases, Bob can anonymously browse a web site of the web service without using a sign-in or other based authorization technique, and/or in other cases, Bob can login/sign-in to the web site of the web service with user credentials for this web service). In this scenario, Bob's client device is typically associated using an identifier (ID) via a cookie associated with that session (e.g., cookies can be stored past a given session, that is, cookies can be persistently stored, in this example, on Bob's client device). In this example, Bob's activities on the ACME.com site can be monitored and tracked using, for example, a pixel log. In such cases, the web service, ACME.com, can customize content for Bob based on Bob's monitored activities on the ACME.com site. In particular, using various techniques disclosed herein, dynamic categories can be generated to accurately and effectively customize an organization and presentation of content and associated information available on the ACME.com site based on Bob's monitored activities (e.g., Bob's determined user preferences for categories and/or content available on the ACME.com site). As such, user profile-based targeted service/product offerings can be presented to Bob based on Bob's monitored user activities on the web site. As an example, if the ACME.com site is an online news site, and Bob's monitored activities indicate an interest in certain news content based on topics (e.g., Bob may be interested in news about sports, politics, entertainment, and/or other categories), or if Bob prefers to browse news content based on geography (e.g., Bob may be interested in news about India, China, and/or other geographies), then such news categories can be determined and presented to Bob as categories in a top navigation pane on the ACME.com home web page of the web site. As another example, if the ACME.com site is an apparel e-commerce site, and Bob's monitored activities indicate an interest in certain apparel categories (e.g., running shoes, running clothes, and/or other categories) or based on certain attributes (e.g., black shoes, blue running shorts, and/or other attributes), then such apparel categories can be determined and presented to Bob as categories in a top navigation pane on the ACME.com home web page of the web site. As yet another example, dynamic categories based on Bob's monitored activities can be provided in response to a search request received from Bob using an internal search available on the ACME.com site (e.g., if Bob searches for shoes, then categories for running shoes and black shoes can be presented to Bob as suggested categories responsive to that search request).

In another common use case scenario, users may also change their preferences during a session. For example, assume that Alice is browsing the ACME.com site, which is an e-commerce site that offers various apparel products for sale. Also assume that during a given session on the ACME.com site, Alice initially is browsing for women's dresses, and later in the session, Alice is browsing for women's shoes (e.g., black pumps). In this example, a user, Alice, is switching an interest to black pumps while browsing an apparel or shoe e-commerce web site. The observed change in this user's interests during the session can be changed to provide different dynamically determined categories (e.g., and/or content associated with such categories) for providing a customized navigation of the ACME.com site for Alice during the session on the ACME.com site (e.g., in this example, a new category for pumps and/or black pumps can be provided as categories in a top navigation pane on the ACME.com home web page of the web site) and/or such new dynamic categories can be presented in response to certain queries submitted by Alice using an internal search option that is provided on the ACME.com site (e.g., in this example, a new category for pumps and/or black pumps can be provided as categories in response to a given query submitted by Alice on the ACME.com web site).

Generally, web service providers desire to be able to provide navigability of categories for users based on their preferences in order to maximize revenue/interest of users on their site and services, and having a simple static structure fails to address preferences of different users and user's changing preferences over time (e.g., intra/inter session(s), based on a user's activity, such as Bob's activity versus Alice's activity on the ACME.com site, and/or based on an aggregate of users on the site).

As further described below, these and various other features and techniques are disclosed for providing dynamic categories.

Overview of an Example Dynamic Categories Service

FIG. 1 is a block diagram illustrating an overview of an architecture of a system for providing dynamic categories in accordance with some embodiments.

As shown, various user devices, such as a laptop computer 102, a desktop computer 104, a smart phone 106, and a tablet 108 (e.g., and/or various other types of computing devices that can access the Internet to browse, for example, various types of web sites) are in communication with Internet 140 to access various web sites provided by different web servers 130A, 130B, . . . , 130N (e.g., which can each serve one or more web sites).

For example, the web servers can each provide a web site, such as a merchant's web site that can offer various products and/or services for sale from the merchant, publisher, and/or various other types of web sites (e.g., e-commerce sites, online news/magazine sites, social sites, etc.). Each of the web sites can also include dynamic content that can be used to customize/personalize various content of the respective web site for a user accessing/browsing the web site (e.g., based on a user context, which can be stored in a user profile). For example, users can generally browse and/or search using an internal search option on the web site, to view and/or access different content available on the web site.

The web service providers (e.g., provided using web sites delivered using web servers) can also subscribe to a dynamic categories service 120 (e.g., which can be provided as a cloud-based dynamic categories service for web sites). In some implementations, the dynamic categories service provides various techniques for determining categories (e.g., dynamic categories, which can be synthetically generated categories or selected from existing categories or both) and determining content for associating with such categories for web sites, as disclosed herein.

In some embodiments, in order to present personalized page navigation to a user, prior user behavior can be ingested into a feedback system at the serving end (e.g., using a pixel engine, such as further described herein). For example, results for user requests can be used to generate various user events (e.g., product, category, search, etc.) in real-time, which can be used in computing user profiles. These user profiles in turn can be fed back into an inference system (e.g., using a dynamic categories engine, such as further described herein) to generate dynamic categories customized to the user's preferences (e.g., a user context, which is stored in a user profile). This results in highly relevant and specific categories based on prior user activities (e.g., a user history of activities in a given session or across multiple sessions) as opposed to a static navigation scheme.

In particular, a web server can communicate with the dynamic categories service to provide information regarding user activities performed on the web site to the dynamic categories service (e.g., using a pixel log, such as described below, and/or using a user activity feed, and/or in some other format, using an API or other mechanism for communications over the Internet between the web server and the dynamic categories service, such as using secure data communications). In addition, the web site can also provide a web site content data feed to the dynamic categories service (e.g., the web site content data feed can be an XML formatted data feed, or in another format, includes existing categories and existing content, such as a product catalog, using an API or other mechanism for communications over the Internet between the web server and the dynamic categories service, such as using secure data communications). The dynamic categories service can communicate, for example, dynamic categories (e.g., and associated content, using an API or other mechanism for communications over the Internet between the web server and the dynamic categories service, such as using secure data communications) as a data feed to the web site. As a result, this dynamic categories data feed can be applied by the web site to generate customized/personalized web content for presentation of a customized navigation of the web site to a particular user.

In some implementations, the dynamic categories service can be implemented on a computer server or appliance (e.g., or using a set of computer servers and/or appliances) or as a cloud service, such as using Amazon Web Services or other cloud service providers. For example, dynamic categories service 120 can be implemented on one or more computer servers or appliance devices or can be implemented as a cloud service, such as using Amazon Web Services or another cloud service provider for cloud-based computing and storage services.

Figure 2:
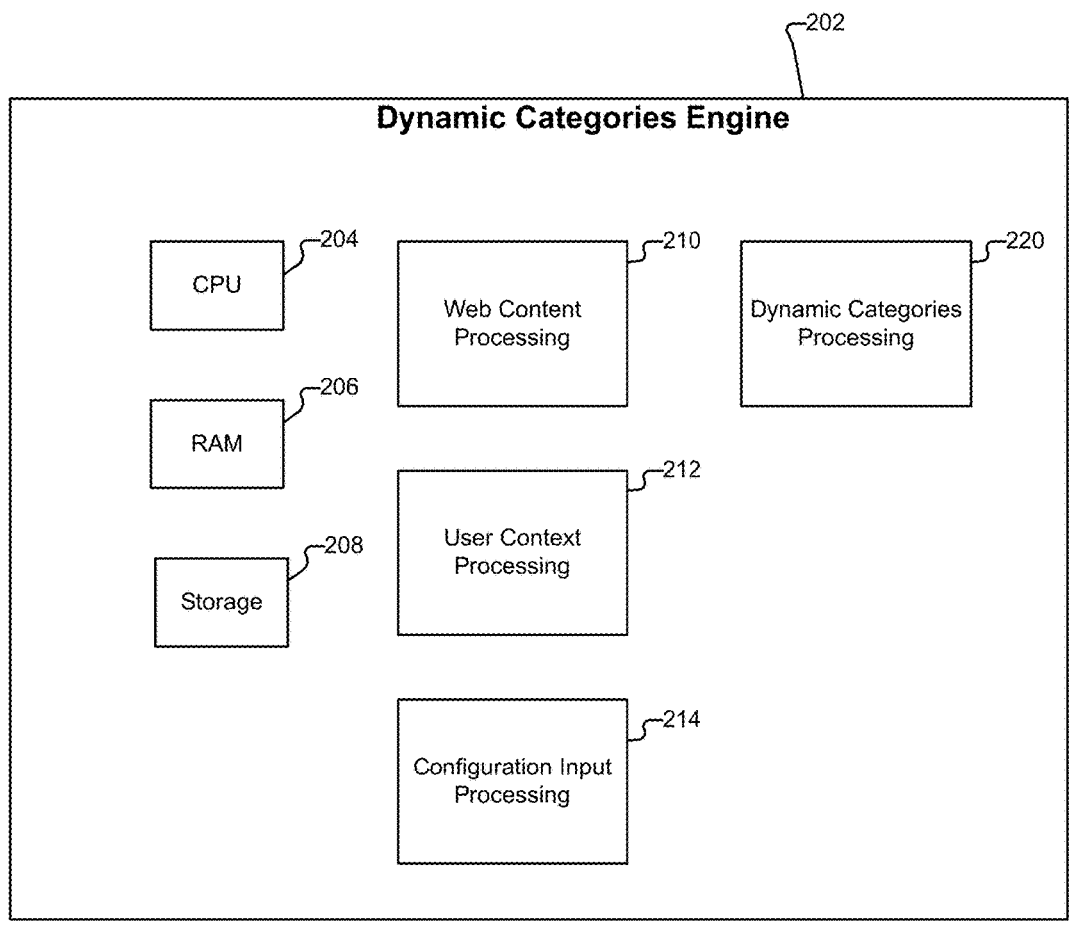
FIG. 2 is a functional block diagram illustrating a dynamic categories engine in accordance with some embodiments.

FIG. 2 is a functional block diagram illustrating a dynamic categories engine in accordance with some embodiments. As shown, a dynamic categories engine 202 includes a CPU 204, a RAM 206, and a data storage 208. For example, dynamic categories engine 202 can be implemented on the dynamic categories service 120 as shown in FIG. 1.

As also shown in FIG. 2, dynamic categories engine 202 includes a web content processing component 210 (e.g., to process, and in some cases, categorize web content of a web site, and to associate content available on the web site with such categories, as further described herein), a user context processing component 212 (e.g., behavior signal data that provides monitored/tracked user activities data can be provided for subscriber/monitored web sites by using click logs/pixel tags data for monitoring user activities during a session to provide a user's browsing history, and/or other behavior signal data as described herein), configuration input processing component 214 (e.g., for processing configuration input, such as user input signals to configure or customize the dynamic content processing for a web site, such as boost values for certain categories and/or content on a web site, and/or various other configuration input, such as user feedback), and a dynamic categories processing component 220 (e.g., for determining categories for providing dynamic categories based on input received from web content processing, user context processing (e.g., behavior signal processing), and/or configuration input processing components). The processing performed by each of these components is further described below. In some implementations, one or more of these functions can be performed by another device or function, such that the behavior signal processing and/or the other signal processing can be performed using another device or function, which can provide respective input to the dynamic categories engine. As another example implementation, various components can be implemented as a common component, such as a behavior processing component that can be implemented to receive and process both behavior signals and other signals (e.g., configuration input signals). In some implementations, the dynamic categories engine is implemented using the Apache Solr open source framework as further described below with respect to FIG. 3.

In some implementations, dynamic categories engine 202 can implement the dynamic categories service 120 described above with respect to FIG. 1. For example, a dynamic categories determination for a user or an aggregate of users (e.g., based on a user profile) for a web site can be processed using CPU 204 and RAM 206 to automatically generate a set of dynamic categories results that can be stored in storage 208 and communicated to a web site that subscribes to dynamic categories service 120 for presenting the set of dynamic categories to a user via the user's web browser executed on the user's device (e.g., a client device, such as via a web browser executed on a smart phone, laptop, computer, or other computing device).

In some cases, dynamic categories can also be tuned depending on what user purpose the web service provider wants to fulfill, such as the following example applications/types of dynamic categories. For example, dynamic categories can be provided in which dynamic categories are created for users based on aggregate user demands. As another example, personalized dynamic categories can be provided in which dynamic categories are created for users specifically based on a user's or a group of users' preferences. As yet another example, personalized dynamic navigation structures of the site can be provided in which the personalized navigation structures are created for users reordering and ranking of a browse path on a site based on user preferences (e.g., reordering and ranking of the browse path can be determined based on specific user preferences or aggregate user preferences).

For example, such personalized navigation schemes based on the above-described dynamic categories, personalized dynamic categories, and/or personalized navigation structures can be further used to not only augment or replace the static navigation tree typically used by web site providers but also to surface interesting widgets on various pages in the site resulting in increased user engagement as discussed above.

Thus, the dynamic category system can suggest various ranked categories that would be of interest to a user or group of users (e.g., along with a numerical score indicating how relevant it is for the particular user or users). As further described below, such dynamic categories related techniques can be used for dynamic categories, personalized dynamic categories, and/or personalized dynamic navigation structure of web sites.

Further, various techniques for providing dynamic categories as disclosed herein can also determine for a given set of content in a given category set, what is the likelihood of the content being relevant for the user. Thus, for providing a personalized dynamic navigation structure of a site (e.g., web site and/or web application), it can reorder an existing category structure for a user.

Overview of Dynamic Categories Techniques and System Architecture

Figure 3:
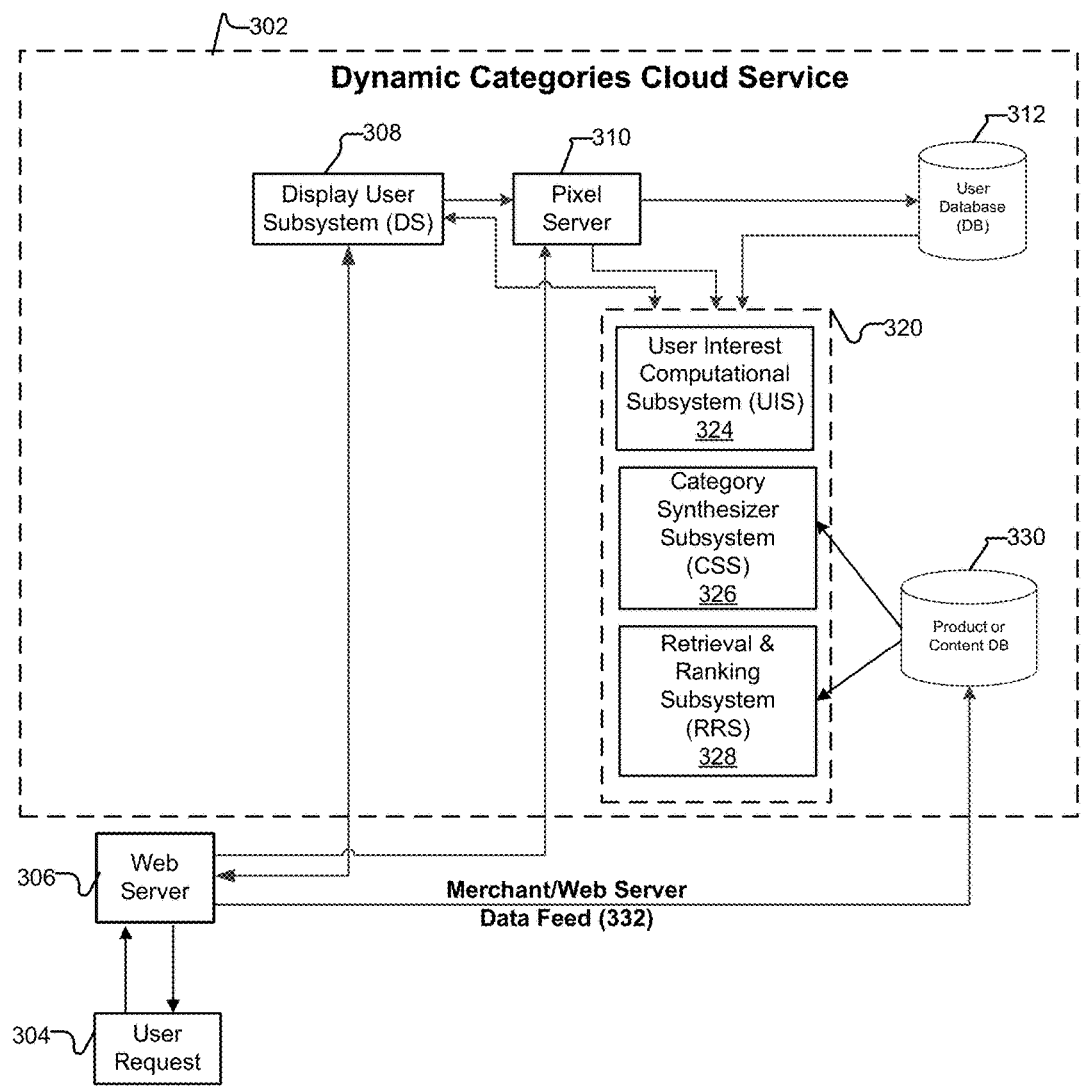
FIG. 3 is a functional diagram illustrating a detailed architecture of a system for providing a dynamic categories cloud service in accordance with some embodiments.

FIG. 3 is a functional diagram illustrating a detailed architecture of a system for providing a dynamic categories cloud service in accordance with some embodiments. For example, this detailed architecture for providing a dynamic categories cloud service shown as 302 in FIG. 3 can be used to implement processing components shown as 210, 212, 214, and 220 of the dynamic categories engine illustrated in FIG. 2.

Referring to FIG. 3, a user request 304 is received by a web server 306. In this example, web server 306 serves a web site provided by a web service, and this web service is also a subscriber to dynamic categories cloud service 302. For example, a user can interact with this web site that is provided by the web server to browse or search for content on the web site (e.g., a user request).

As also shown, web server 306 is in communication with a display user subsystem (DS) 308 and a pixel server 310 of dynamic categories cloud service 302. For example, web sites (e.g., sites) can generally track activities of users on the web site (e.g., monitoring and tracking a user's browsing activity during a session on the web site). In some implementations, the web site can be configured to use cookies (e.g., in pixel logs, in which cookies are used to identify a user, at least anonymously, generally per device, and in which the cookies are typically persistent on the device, that is, the cookies are stored across sessions) or other approaches to track a user's activity on the web site. Thus, what is being actively browsed, viewed, searched, added to a cart, purchased, emailed, liked or disliked, and/or other user activities (e.g., user requests, such as user request 304) on the web site can be monitored (e.g., to generate a user profile based on tracked activities of users). In this example, web server 306 implements a pixel log mechanism that facilitates user activity tracking/monitoring by dynamic categories cloud service 302. As shown, pixel logs data input is received at a pixel server 310.

As also shown, pixel logs data input is received from pixel server 310 at a dynamic categories processing subsystem 320. Dynamic categories processing system 320 includes a user interest computational subsystem (UIS) 324 (e.g., for behavior analysis). For example, UIS 324 can extract various session/behavior related data parameters (e.g., browsing activity, navigation patterns, and/or various other monitored user activity, such as described herein) and associate those extracted various session/behavior related data parameters with a user profile (e.g., for a particular user and/or for an aggregate of users of the web site).

In some embodiments, dynamic categories cloud service 302 includes various subsystems as further discussed below and as shown in FIG. 3. Display user subsystem (DS) 308 is a component of the dynamic categories cloud service that facilitates a communication with the web site(s) for the display of products/categories to the user on the web site(s) (e.g., via web server 306 and/or other subscriber web services). Pixel server 310 is a component of the dynamic categories cloud service that facilitates generating a log of all user activity (e.g., a pixel log) on the site (e.g., in some implementations, this function can also be performed in coordination with and/or by other components as shown in FIG. 3, such as DS 308 and/or UIS 324). User interest computation subsystem (UIS) 324 is a subsystem of dynamic categories processing system 320 that automatically parses the user activity logs (e.g., pixel logs) and automatically computes user interests based on various machine learning algorithms, as further described below. A category synthesizer subsystem (CSS) 326 is a subsystem of dynamic categories processing system 320 that automatically understands the user interests and determines one or more categories based on the user interests (e.g., synthesizes and generates meaningful dynamic categories based on user interests). A retrieval and ranking subsystem (RRS) 328 is a subsystem of dynamic categories processing system 320 that generates a ranked list of content for a dynamic category (e.g., determining a ranked list of content, such as products or other content, for each dynamic category determined/generated by CSS 326).

Display User Subsystem (DS)

In some embodiments, DS 308 provides the user interface (UI) layer of a web site and/or communicates UI layer data (e.g., using an API or other communication protocol techniques) to a web server that can translate the received UI layer data input (e.g., dynamic categories and associated ranked list of content for each dynamic category) for presenting to a user's client device request for interacting with the web site presented by the web server (e.g., web server 306). Specifically, the DS can present dynamic categories (e.g., both selected static categories and synthetic categories), products/content, and other merchant information/content for presentation to the user interacting with the web site provided by the web server.

In particular, for displaying the determined dynamic categories, an example implementation can involve the web server in communication with the DS for retrieving a list of dynamic categories for a user, in which the list of dynamic categories was generated using CSS 326, as further described below. Also, to provide the list of products or other merchant related content within each of the dynamic categories to the web server in communication with the DS, the DS can communicate with RRS 328 to retrieve a list of products or other merchant content to present to the user via the UI layer for each of the determined dynamic categories, as further described below.

Pixel Server

In some embodiments, pixel server 310 generates a log of activity on a per user basis. An example implementation can be a pixel on the web site tracking all user activity. As shown, pixel server 310 is also in communication with a user database (DB) 312 of dynamic categories cloud service 302. For example, logged user activity data can be stored in user DB 312.

User Interest Computation Subsystem (UIS)

In some embodiments, UIS 324 (e.g., UIS engine) processes activity logs for each user and computes a list of user interests. As shown, UIS 324 is also in communication with user DB 312, which stores logged user activity data that can be provided to UIS 324 for processing activity logs for each user and computing user preferences based on the monitored user activities. For example, user interests can include one or more of the following types of preferences related data: demographic information (e.g., gender preferences, ethnicity, age, and income); psychographic information (e.g., shopping orientation, lifestyle, and social class); geographic information (e.g., area of residence and/or area of user while accessing a web site, which can be determined, for example, based on an IP address associated with a user's browsing session(s)); behavioral preferences (e.g., time of day shopped, average amount spent in an order, preference for Internet versus offline shopping/browsing, and purchase behavior/history); and content type preferences (e.g., content preferred by a user or aggregate of users on a merchant's web site, such as brand, size, type of merchandise, etc., including an absence or preference of user indicated content preference(s), such as user preference information indicating that Alice has searched/browsed black dresses and black shoes, but that Alice has not searched/browsed black socks, etc.). For example, in the case of a retailer related web site, content type preferences can include product type preferences (e.g., pumps versus loafers), brand preferences for each product type (e.g., user likes pumps from a particular designer, such as Christian Louboutin™), or price range preference for every product type (e.g., user prefers products in a price range of less than $100 for pumps or user prefers a price range of $500-$600 for pumps). For example, in the case of a publisher related web site (e.g., online newspaper/magazine or other type of publisher), content type preferences can include topical preferences or author preferences. In some cases, content type preferences can also include specific attribute preferences, which can include, for example, combinations of preferences (e.g., user prefers red soles for pumps but blue soles for flats). In some cases, content type preferences can also include user feedback (e.g., which recommendations the user likes or dislikes).

In some implementations, user preference computations can be based on various user events or absence of user events, which may indicate a preference or lack of preference for a particular attribute or set of attributes. For example, for a retailer related web site, the user DB can record one or more of the following (e.g., so that the UIS can infer the above): product pages viewed (e.g., or product pages not viewed); add to cart of product (e.g., or lack of such an event); purchase of products (e.g., or lack of such an event); and time spent on particular content. As another example, for a publisher related web site, the user DB can record one or more of the following (e.g., so that the UIS can infer the above): browse paths; content viewed; and amount of time spent viewing content.

In some implementations, the UIS engine (e.g., UIS 324) can be implemented as a real-time event processing system or a periodic Map Reduce (e.g., also commonly referred to as MapReduce) system for processing user activities for a user and/or a user profile (e.g., based on a user, such as a specific user or a user identifier, and/or based on an aggregate of users) and computing dominant content types, content attributes, demographic preferences, psychographic preferences, and/or other user preference related data, such as described herein. In some cases, the UIS engine can weight recent user behavior higher than past/older user behavior so that changing user preferences are accounted for by the UIS engine (e.g., as user interests can evolve over time between, or even during, a given session on a web site).

An example implementation of such a Map Reduce system is described below. In this example, the following can be provided as input to the Map Reduce system: last 'n' number of weeks of user data (e.g., events) for a user. The map phase can include the following mapping operations performed by the Map Reduce system: for every event, output interesting tuples and weights (e.g., tuples of interest can be different based on a space or context of a given web site, such as further discussed below). In some cases, recent events can be weighted higher than older events, user feedback can be allocated higher weights, and/or merchant/subscriber configuration input can be used for allocating higher/lower weights. As an example for a retailer related web site, a retailer space tuple (e.g., n-tuple) can be (brand, product type), (brand, product type, sale), and/or various other forms of tuples that are applicable to a retailer space. As an example for a publisher related web site, a publisher space tuple (e.g., n-tuple) can be (topic), (topic, author), (geo, topic), and/or various other forms of tuples applicable to a publisher space. Finally, the reduce phase performed by the Map Reduce system can include the following: sum the weights for every tuple, and then select dominant tuples for the user. For example, the highest weighted tuples for the user can be selected.

In some embodiments, various machine learning algorithms can be implemented by the UIS engine. In an example implementation, the UIS engine can implement a mapping using a Map Reduce system, such as described above, that can be based on rules either manually coded or machine generated. For example, a collaborative or content-based recommendation system machine-learning algorithm can be used to determine a user's preference to various attributes. The recommender system can generate a profile of a user interests based on how the user has interacted with various content and can distill the content into a set of attributes. In this case, a rating can represent events that the system can interpret as positive or negative events (e.g., for a retail website viewing a product but not purchasing it would have a less positive rating than viewing a product and adding it to cart). Thus, the negative or positive association with a certain piece of content can then be associated with attributes of the content. Finally, the system can output the affinity or probability of that user liking that attributes as well as measure of confidence in that affinity.

The example dynamic categories system/service described herein discloses using user preferences and attributes (e.g., content preferences, demographic, geographic, psychographic, and various other user preferences and attributes, such as discussed above) to aggregate web site content into categories. The user preferences can be determined as described above for a user or can be determined for a group of users (e.g., an aggregate user profile for example, for all users in the range of 20-25 years of age; for all users in the range of 20-25 years of age who prefer to shop in store; or for all users who bought item X or viewed item X). Thus, there is a large breadth of possible variations of categories that can be produced based on either individual or groups of users using the various techniques described herein.

In another embodiment, this user behavior can be optionally combined with other tags (e.g., from description content for a product catalog, or from other automated or manual tagging systems), which can be used as filters to create a set of categories. For example, continuing from the example above, the system can be configured to find items that users in the range of 20-25 years of age prefer and have the tag black (e.g., as determined by the description content in the product catalog).

Category Synthesizer Subsystem (CSS)

In some embodiments, CSS 326 (e.g., CSS engine) receives the user interest tuples computed by UIS 324 as described above as input and automatically generates a list of "human-readable" category names that captures the user's interests based on the computed user interest tuples. For example, in a retail space, a particular user interest tuple, such as (Christian Louboutin™, Pumps, Sale), can be mapped to generate a new dynamic category, such as in this example, "Christian Louboutin™ Pumps on Sale" or, in some implementations, to a listing of the terms in the tuple, such as "Christian Louboutin™ Pumps Sale" or "Christian Louboutin™, Pumps, Sale." As another example, in a publisher space, a particular user interest tuple, such as (Entrepreneurship, India), can be mapped to generate a new dynamic category, such as in this example, "News about Entrepreneurship in India" or, in some implementations, to a listing of the terms in the tuple, such as "Entrepreneurship India" or "Entrepreneurship, India."

For example, the mapping can be based on rules either manually coded or machine generated. An example technique to generate rules automatically is to process a text corpus of a description about various categories, which can be provided from a product or content database (DB) 330 that receives and stores product, category, and/or other web site content from a web site via a merchant/web server data feed 332 (e.g., an XML or other formatted data feed) as shown, and learn how phrases containing various tuple attributes are formed using various machine learning techniques as further described below. The result of this processing (e.g., performed using CSS 326) can provide a language model that can then be used to generate a dynamic category name from each user interest tuple. As an example, if a review of the merchant's web site typically includes a brand name followed by a product type/name (e.g., Nike® sneakers or Nike® sneakers on sale), then similar tuples can be automatically generated using various techniques described herein based on tuples of user preferences (e.g., user interest tuples) that were determined as described above using UIS 324. As another example, the user preferences (e.g., user interest tuples) can just be listed, such as separated by commas, spaces, and/or in other forms, and such need not be translated into a natural language phrase(s) or sentence(s), such as similarly discussed above.

In one embodiment, various machine generated implementation techniques are provided for a machine generated mapping of the user interest tuples into a list of "human-readable" category names (e.g., natural language versions of category names) that captures the user's interests for each computed user interest tuple. An example technique to generate rules automatically is to process a text corpus of a description about various categories and automatically learn (e.g., using various machine learning algorithms) how phrases containing various tuple attributes are formed. In an example implementation, this can be implemented using a language model that is then used to generate a dynamic category name from a tuple as further described below.

Retrieval and Ranking Subsystem (RRS)

In some embodiments, RRS 328 receives generated category names (e.g., for dynamic categories) from CSS 326 and then provides a ranked list of interesting categories (e.g., can provide a ranked listing across both the synthesized and existing categories) for a given context (e.g., such as for a user based on a user profile and a web site, and use case for the web site, such as a location of the merchant web site, and/or web service provider configuration input, such as a web service provider may or may not want top level navigation of ACME.com to dynamically change as much (or at all, other than possibly an ordering of such top level navigation categories), in which the web site navigation customization can be tunable/configurable by a web service provider for different locations of their web site).

In some embodiments, RRS 328 (e.g., RRS engine) receives product, category, and/or other web site content from product or content database (DB) 330 (e.g., which can be populated using merchant/web server data feed 332, as described above), and RRS 328 then also provides a ranked list of interesting content for each dynamic category (e.g., to populate interesting/relevant products for a particular synthesized product category or for a selected existing product category). In some implementations, the RRS executes a search engine that searches over semi-structured content corpus (e.g., including both structured attributes and free text content, which can include product, category, and/or other web site content from product or content DB 330). In this example implementation, an input query to the search engine can include the dynamic category tuple, and in some cases, can also include other user preferences (e.g., based on user activity, user feedback, and/or various other types of user preferences such as described herein). The search engine can then perform a look-up of specific fields for these tuples to retrieve relevant documents (e.g., product or other content available on the web site, which is received via a merchant/web server data feed (332) and stored in a data store (330) as discussed above). The RRS engine can then rank the returned relevant documents. For example, the returned relevant documents can be ranked based both on their general importance (e.g., popularity, merchant customization such as boost value(s)/factor(s), and/or other importance criteria) as well as user preference, as further discussed below.

Example algorithms for implementing the RRS engine are further described below. An example algorithm for implementing the RRS engine can rank output categories scored on a set of parameters that can be customizable. The inputs to such an algorithm can include a list of users with their attribute preference vectors as outputted by the UIS and a set of attribute vector spaces associated with each dynamic categories. The user attribute preference matrix can then be blended with any other signals that boost or dampen certain factors (e.g., user likes "sale" but merchant prefers not to show "sale") to generate a final attribute preference vector for the user. This final attribute preference matrix for the user can then be applied to the content attribute vector to create a score for each piece of content, in this case, the tuple formed earlier for the dynamic categories names. The dynamic categories can then be ranked for each user. Optionally, other types of signals that can boost or dampen certain categories can be applied as well (e.g., the variety of items available in that category, performance metrics associated with the items in that category etc.).

As an example use case scenario, in a retail space, a dynamic category tuple (e.g., Christian Louboutin™, Pumps, Sale) for a female user can be implemented by configuring the search engine to perform a look-up for the following specific fields: a brand field of the corpus for "Christian Louboutin™," a product field for "Pumps," and a gender field for "female." In some cases, the ranking phase can weigh products with higher discounts with a greater weight in order to capture the sale aspect of the tuple. In some embodiments, the ranking system can use a popularity and sell-ability of the product (e.g., as additional signal input) as other important signals for scoring that can be used for selecting and ranking products to include for display for each dynamic category tuple.

An example approach for implementing the RRS engine for retrieval of content, such as for determining which products to populate as content for a given dynamic category and/or other content to populate for a given dynamic category, is disclosed in U.S. Pat. No. 8,676,798, entitled QUERY GENERATION FOR SEARCHABLE CONTENT filed Sep. 30, 2009 and issued Mar. 18, 2014, assigned to BloomReach Inc., which is incorporated herein by reference for all purposes. In particular, such an RRS engine implementation can use content performance metrics blended with relevance, and in some cases case also include user or merchant preferences, to rank items within category. For example, a vector space model can be defined that can output such with weights tunable based on application (e.g., weights for ranking flowers can be different than those for ranking articles, etc.).

In an example implementation, Apache Solr open source search platform is used (e.g., or another open source or commercially available search platform can be used) to implement the above-described searching operations in order to determine personalized results of content for each dynamic category based on a user context and/or other signals and input. For example, the Apache Solr platform can be used to provide products for a dynamic category tuple based on a user profile using various techniques described herein.

Example Web Interface Implementations for Providing Dynamic Categories

Figure 4A:
FIGS. 4A and 4B are example screen diagrams illustrating a graphical user interface (GUI) of a web interface of an example web site.
Figure 4B:

FIGS. 4A and 4B are example screen diagrams illustrating a graphical user interface (GUI) of a web interface of an example web site.

In some implementations of the following methodology, a user's browse behavior can be used to create dynamic categories for the user on a (special) page on a web site. For example, this page on the web site can be accessed by clicking on an icon (e.g., or other user input, such as a button, a link, a voice command input, etc.) anytime during a user's visit on the web site.

Referring to FIG. 4A, suppose a user visits a web site and browses the following items in a catalog through a site search and category browse on the example web site as shown in FIG. 4A. In particular, FIG. 4A shows an original static browse menu (e.g., category tree) for an example web site.

Referring now to FIG. 4B, assuming that the original web site had the original static browse menu (e.g., category tree) as discussed above, FIG. 4B shows products that were browsed (e.g., viewed or selected for viewing) by an example user on this example web site.

Figure 5:
FIG. 5 is a screen diagram illustrating a graphical user interface (GUI) of a web interface of a web site for providing dynamic categories in accordance with some embodiments.

FIG. 5 is a screen diagram illustrating a graphical user interface (GUI) of a web interface of a web site for providing dynamic categories in accordance with some embodiments. In particular, FIG. 5 illustrates dynamic categories created for the user based on the user's previous product browsing activity (e.g., such as user product browsing activity as discussed above with respect to FIGS. 4A and 4B) using various techniques for providing dynamic categories as disclosed herein.

In an example implementation, dynamic categories can be generated based on monitored user product browsing activity (e.g., created for the user based on the user's previous product browsing activity) using a dynamic cloud service/system, such as described above with respect to FIG. 3. In this example, the display user subsystem and/or pixel server (e.g., DS 308 and/or pixel server 310) can generate a log of user activity on the web site and store that in a user activity data store (e.g., user DB 312).

The user interest computational subsystem (e.g., UIS 324) can compute interests of the user based on machine learning algorithms and can then determine whether the user has any preferences, such as for one or more of the following example user preferences: (Brand: Hugo Boss®, Price: Sale), (Category: Men's Apparel, Price: Sale), (Category: Loafers & Slip Ons, Price: Sale), (Category: Dress Shirts, Price: Sale), and/or various other user preferences.

The category synthesizer subsystem (e.g., CSS 326) can generate the following category names based on these determined example user preferences: Products by Hugo Boss® on Sale, Men's Apparel on Sale, Loafers & Slip Ons on Sale, Dress Shirts on Sale, and/or other category names based on other user preferences.

The retrieval and ranking subsystem (e.g., RRS 328) can retrieve products for these determined dynamic categories, rank each of these determined dynamic categories, and generate a ranked list for dynamic categories including products associated with each of these dynamic categories (e.g., and the products can also be ranked using various techniques described above).

Finally, the display user subsystem (e.g., DS 308) can display these dynamic categories ranked by a relevance function. For example, the results can be generated as a GUI output for presentation from a web server (e.g., web server 306), such as shown in FIG. 5. In particular, FIG. 5 illustrates dynamic categories created for the user based on the user's previous product browsing activity (e.g., such as user product browsing activity as discussed above with respect to FIGS. 4A and 4B) using various techniques for providing dynamic categories as disclosed herein.

These new categories and products in this example are presented on a web page as shown in this example output in FIG. 5. As another example, the same categories can be inserted back in the relevant order on the main browse menu shown in FIG. 4A. As yet another example, these new categories in this example can be presented to the user in response to a search query on the web site (e.g., returning dynamic categories that are relevant to a particular search query performed by the user using an internal search of the web site).

Various other UIs/GUIs can be implemented to display such output (e.g., a browse menu such that the header of a page displays these dynamic categories, a page, an audiobased user interface, and/or various other forms of UIs/ GUIs, which can be implemented to use the dynamic category techniques disclosed herein) as would now be apparent to one of ordinary skill in the art.

Example Processes for Providing Dynamic Categories

Figure 6:
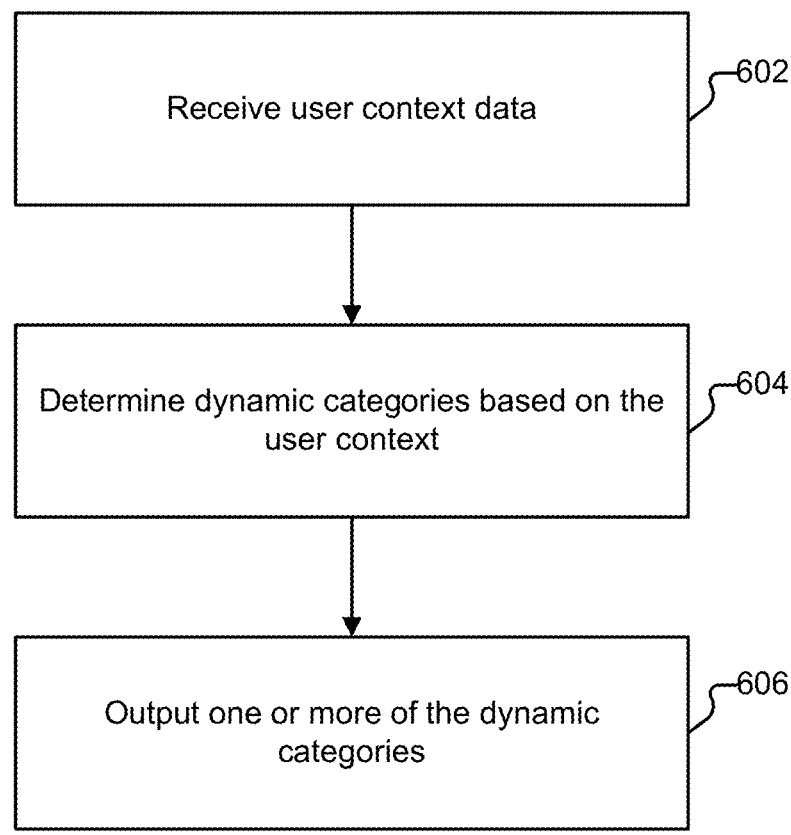
FIG. 6 is a flow diagram illustrating a process for providing dynamic categories in accordance with some embodiments.

FIG. 6 is a flow diagram illustrating a process for providing dynamic categories in accordance with some embodiments. In some embodiments, the process for providing dynamic categories is performed using the dynamic categories system/service, such as described above with respect to FIGS. 1-5.

Referring to FIG. 6, at 602, user context data is received. For example, the user context data can be based on monitored user behavior on a web site that is tracked using a pixel log.

At 604, dynamically determining a plurality of categories for the user based on the user context data is performed, in which the plurality of categories is for categorizing content on a web site. For example, one or more of the plurality of categories can include a synthesized category on the web site that is dynamically generated based on the monitored user behavior on the web site. In some cases, one or more of the plurality of categories can include an existing category on the web site (e.g., that is selected and ranked based on the monitored user behavior on the web site).

At 606, one or more of the dynamic categories can be output. For example, one or more of the dynamic categories can be output using various user interface output techniques, such as discussed above with respect to FIG. 5.

Figure 7:
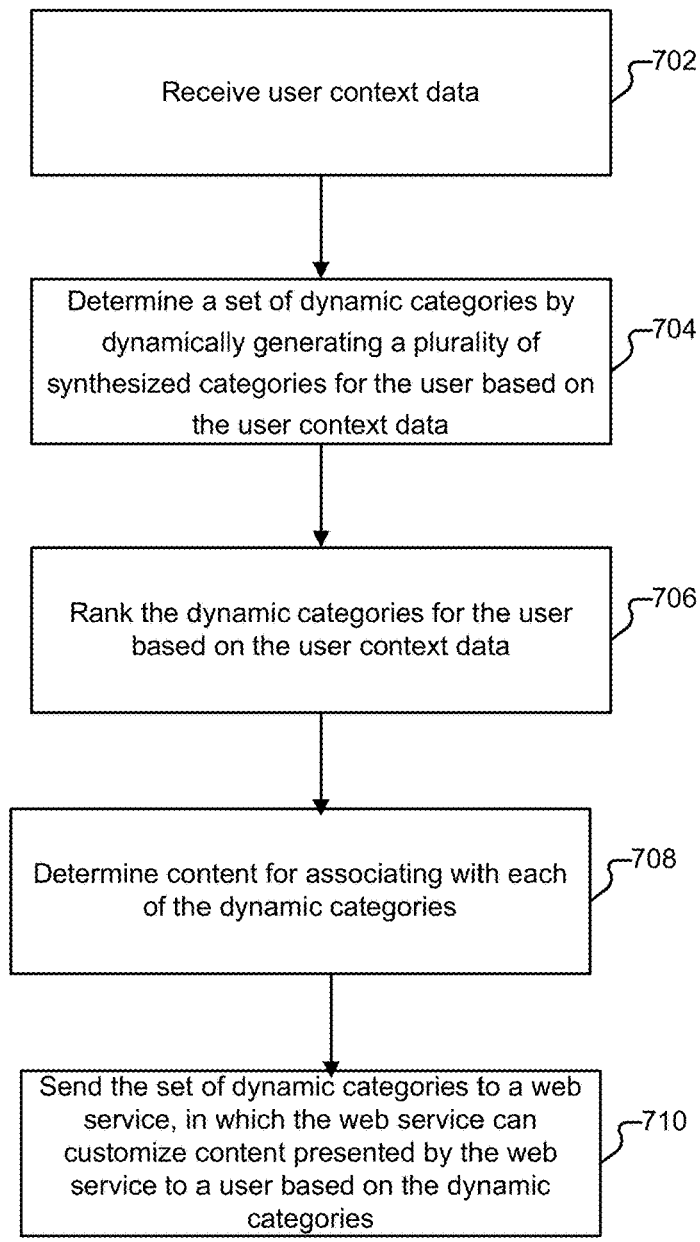
FIG. 7 is another flow diagram illustrating a process for providing dynamic categories in accordance with some embodiments.

FIG. 7 is another flow diagram illustrating a process for providing dynamic categories in accordance with some embodiments. In some embodiments, the process for providing dynamic categories is performed using the dynamic categories system/service, such as described above with respect to FIGS. 1-5.

Referring to FIG. 7, at 702, user context data is received. For example, the user context data can be based on monitored user behavior on a web site that is tracked using a pixel log.

At 704, dynamically determining a set of dynamic categories by dynamically generating a plurality of synthesized categories for the user based on the user context data is performed, in which the set of dynamic categories is for categorizing content on a web site. For example, each synthesized category can be dynamically generated based on the monitored user behavior on the web site and/or various other signals, such as an aggregate of user activity on the web site, user feedback, web service provider configured input, and/or various other signals, such as described herein.

At 706, ranking the dynamic categories for the user based on the user context data is performed. For example, the dynamic categories can be ranked based on the monitored user behavior on the web site and/or various other signals, such as an aggregate of user activity on the web site, user feedback, web service provider configured input, and/or various other signals, such as described herein.

At 708, determining content for associating with each of the dynamic categories is performed. For example, if the web site is a merchant's e-commerce web site that offers various apparel products for sale, then products relevant to each dynamic category can be determined using various techniques described herein. As another example, if the web site is a news web site that offers various news articles for viewing, then news articles relevant to each dynamic category can be determined using various techniques described herein.

At 710, sending the set of dynamic categories to a web service is performed, in which the web service can customize content presented by the web service to a user based on the dynamic categories. For example, the dynamic categories can be output using various user interface output techniques, such as discussed above with respect to FIG. 5.

In some implementations, a cloud service provides dynamic categories (e.g., including suggested/customized web content that can be in the form of synthesized or selected existing categories and/or content associated with such categories, which can also be ranked/scored for relevance) for subscribing web sites (e.g., suggested content/ products/categories, etc.) based on a user context (e.g., a user profile) to the subscribing web sites for presentation to the user associated with the associated user profile.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamic categories, comprising:
a processor configured to:
receive user context data, wherein the user context data includes demographic information, psychographic information, geographic information, behavioral preferences, content type, or any combination thereof, and wherein the receiving of the user context data comprises to:
weigh a first piece of user context data by a first weight to obtain a first weighted piece of user context data; and
weigh a second piece of user context data by a second weight to obtain a second weighted piece of user context data, the first weight being different from the second weight, the first weight and the second weight both relating to subscriber configuration input; and
dynamically determine a plurality of categories for a user based on the first and second weighted pieces of user context data, wherein the plurality of categories is for categorizing content on a web site, wherein the dynamically determining of the plurality of categories for the user comprises to:
dynamically generate a plurality of synthesized categories for the user based on the user context data, the plurality of synthesized categories includes a synthesized category relating to a combination of a plurality of different content type preferences, a content type preference including content preferred by a user or aggregate of users on a merchant's web site, the content preferred including brand, size, type of merchandise, an absence of user indicated content preference, or a preference of user indicated content preference, wherein at least one synthesized category of the plurality of synthesized categories includes each content type preference of the plurality of different content type preferences, wherein the generating of a synthesized category comprises to:
synthesize the synthesized category based on a user interest tuple, the user interest tuple including a plurality of user interests associated with the user;
rank the generated plurality of synthesized categories; and select the plurality of categories based at least in part on the ranked plurality of synthesized categories, comprising to:
select a first synthesized category or a second synthesized category depending on whether the user is a first user or a second user, respectively, the first synthesized category being different from the second synthesized category; and
a memory coupled to the processor and configured to provide the processor with instructions.

2. The system recited in claim 1, wherein the user context data is based on monitored user behavior on the web site.

3. The system recited in claim 1, wherein one or more of the plurality of categories includes an existing category on the web site.

4. The system recited in claim 1, wherein the user context data is based on monitored user behavior on the web site, and wherein one or more monitored behaviors are tracked using a pixel log.

5. The system recited in claim 1, wherein the processor is further configured to:
send the dynamically determined plurality of categories for the user based on the user context data to the web site.

6. The system recited in claim 1, wherein the processor is further configured to:
send the dynamically determined plurality of categories for the user based on the user context data to the web site, wherein the web site presents at least one of the dynamically determined plurality of categories.

7. The system recited in claim 1, wherein the processor is further configured to:
present at least one of the dynamically determined plurality of categories for the user based on the user context data.

8. The system recited in claim 1, wherein the plurality of different content type preferences includes three or more content type preferences.

9. A method of dynamic categories, comprising:
receiving user context data, wherein the user context data includes demographic information, psychographic information, geographic information, behavioral preferences, content type, or any combination thereof, and wherein the receiving of the user context data comprises:
weighing a first piece of user context data by a first weight to obtain a first weighted piece of user context date; and
weighing a second piece of user context data by a second weight to obtain a second weighted piece of user context data, the first weight being different from the second weight, the first weight and the second weight both relating to subscriber configuration input; and
dynamically determining a plurality of categories for a user based on the first and second weighted pieces of user context data, wherein the plurality of categories is for categorizing content on a web site, wherein the dynamically determining of the plurality of categories for the user comprises:
dynamically generating a plurality of synthesized categories for the user based on the user context data, the plurality of synthesized categories includes a synthesized category relating to a combination of a plurality of different content type preferences, a content type preference including content preferred by a user or aggregate of users on a merchant's web site, the content preferred including brand, size, type of merchandise, an absence of user indicated content preference, or a preference of user indicated content preference, wherein at least one synthesized category of the plurality of synthesized categories includes each content type preference of the plurality of different content type preferences, wherein the generating of a synthesized category comprises:
synthesizing the synthesized category based on a user interest tuple, the user interest tuple including a plurality of user interests associated with the user;
ranking the generated plurality of synthesized categories; and
selecting the plurality of categories based at least in part on the ranked plurality of synthesized categories, comprising:
selecting a first synthesized category or a second synthesized category depending on whether the user is a first user or a second user, respectively, the first synthesized category being different from the second synthesized category.

10. The method of claim 9, wherein the user context data is based on monitored user behavior on the web site.

11. The method of claim 9, wherein one or more of the plurality of categories includes an existing category on the web site.

12. A computer program product for dynamic categories, the computer program product being embodied in a non-transitory, tangible computer readable storage medium and comprising computer instructions for:
receiving user context data, wherein the user context data includes demographic information, psychographic information, geographic information, behavioral preferences, content type, or any combination thereof, and wherein the receiving of the user context data comprises:
weighing a first piece of user context data by a first weight to obtain a first weighted piece of user context data; and
weighing a second piece of user context data by a second weight to obtain a second weighted piece of user context data, the first weight being different from the second weight, the first weight and the second weight both relating to subscriber configuration input; and
dynamically determining a plurality of categories for a user based on the first and second weighted pieces of user context data, wherein the plurality of categories is for categorizing content on a web site, wherein the dynamically determining of the plurality of categories for the user comprises:
dynamically generating a plurality of synthesized categories for the user based on the user context data, the plurality of synthesized categories includes a synthesized category relating to a combination of a plurality of different content type preferences, a content type preference including content preferred by a user or aggregate of users on a merchant's web site, the content preferred including brand, size, type of merchandise, an absence of user indicated content preference, or a preference of user indicated content preference, wherein at least one synthesized category of the plurality of synthesized categories includes each content type preference of the plurality of different content type preferences, wherein the generating of a synthesized category comprises:

synthesizing the synthesized category based on a user interest tuple, the user interest tuple including a plurality of user interests associated with the user;

ranking the generated plurality of synthesized categories; and selecting the plurality of categories based at least in part on the ranked plurality of synthesized categories, comprising:

selecting a first synthesized category or a second synthesized category depending on whether the user is a first user or a second user, respectively, the first synthesized category being different from the second synthesized category.

13. The computer program product recited in claim 12, wherein the user context data is based on monitored user behavior on the web site.

14. The computer program product recited in claim 12, wherein one or more of the plurality of categories includes an existing category on the web site.

* * * * *